United States Patent
Harada

Patent Number: 5,991,532
Date of Patent: Nov. 23, 1999

[54] METHOD AND APPARATUS FOR CONVERTING MULTIMEGABIT-RATE DATA INTO ASYNCHRONOUS TRANSFER MODE CELLS AND VICE VERSA

[75] Inventor: Yuichi Harada, Nagoya, Japan

[73] Assignee: Fujitsu Limited, Kanagawa, Japan

[21] Appl. No.: 08/593,918

[22] Filed: Jan. 30, 1996

[30] Foreign Application Priority Data

Jun. 30, 1995 [JP] Japan .................................. 7-165695

[51] Int. Cl.⁶ .................................................. G06F 9/455
[52] U.S. Cl. ...................................................... 395/500.48
[58] Field of Search .............................. 395/500, 500.44, 395/500.45, 500.46, 500.48; 370/218, 219, 391, 392, 422, 471, 399, 394

[56] References Cited

U.S. PATENT DOCUMENTS

| | | | |
|---|---|---|---|
| 5,124,978 | 6/1992 | Chao | 37/422 |
| 5,130,984 | 7/1992 | Cisneros | 370/399 |
| 5,495,478 | 2/1996 | Wilkinson et al. | 370/399 |
| 5,509,077 | 4/1996 | Moehrmann | 370/391 |
| 5,528,592 | 6/1996 | Schibler et al. | 370/397 |
| 5,568,482 | 10/1996 | Li et al. | 370/471 |
| 5,610,913 | 3/1997 | Tomonaga et al. | 370/219 |
| 5,712,903 | 1/1998 | Bartholomew et al. | 379/88.25 |
| 5,796,734 | 8/1998 | Izawa et al. | 370/394 |

*Primary Examiner*—Kevin J. Teska
*Assistant Examiner*—Dan Fiul
*Attorney, Agent, or Firm*—Helfgott & Karas, PC.

[57] ABSTRACT

A method that converts multimegabit-rate data into asynchronous transfer mode ATM cells and vice versa which are utilized in a switching system. The method includes determining whether the data is effective or ineffective in accordance with a portion of the data. Converting the data into the ATM cells when the data is determined to be effective. Disregarding the data when the data is determined to be ineffective. The method can be realized by an ATM interface converting unit connected with the switching system and a service interface unit. The service interface unit includes at least one of a switched multimegabit data services interface unit, a frame relay interface unit or a digital signal interface unit.

8 Claims, 8 Drawing Sheets

| 8 | 7 | 6 | 5 | 4 | 3 | 2 | 1 |
|---|---|---|---|---|---|---|---|
| | | | | | | C/R | EA 0 |
| | | | | FECN | BECN | DE | EA 1 |

FIG. 4B PRIOR ART

| 8 | 7 | 6 | 5 | 4 | 3 | 2 | 1 |
|---|---|---|---|---|---|---|---|
| | | | | | | C/R | EA 0 |
| DLCI | | | | FECN | BECN | DE | EA 0 |
| | | | | | | D/C | EA 1 |

FIG. 4C PRIOR ART

| 8 | 7 | 6 | 5 | 4 | 3 | 2 | 1 |
|---|---|---|---|---|---|---|---|
| | | | | | | C/R | EA 0 |
| DLCI | | | | FECN | BECN | DE | EA 0 |
| DLCI | | | | | | | EA 0 |
| | | | | | | D/C | EA 1 |

METHOD AND APPARATUS FOR CONVERTING MULTIMEGABIT-RATE DATA INTO ASYNCHRONOUS TRANSFER MODE CELLS AND VICE VERSA

BACKGROUND OF THE INVENTION

(1) Field of the Invention

The present invention relates to a method and apparatus for converting multimegabit-rate data into asynchronous transfer mode (ATM) cells and vice versa, the ATM cells being transmitted in an asynchronous transfer mode.

A broadband integrated services digital network (B-ISDN) which provides a multimegabit-rate data communications service is proposed, and an asynchronous transfer mode (ATM) for use with the B-ISDN to realize such a data communications service is known. In the asynchronous transfer mode, an ATM cell contains 53 bytes of information: a 5-byte header and a 48-byte data field, and such ATM cells are transmitted at a rate of several megabits per second.

Multimegabit-rate data communications interfaces which are currently used include a frame relay (FR) interface with a transmission rate around 2 Mbps (megabits per second), a switched multimegabit data services (SMDS) interface with a transmission rate around 45 Mbps, and digital signal-level 1, 2 and 3 (DS1, DS2 and DS3) interfaces with transmission rates 1.544 Mbps, 6.312 Mbps and 44.736 Mbps. It is proposed to unify these interfaces into an ATM interface for use with the B-ISDN so that the unified ATM interface will provide a high transmission rate above 600 Mbps for multimegabit-rate data communications services. To realize this, it is desired to provide an ATM conversion method which is capable of efficiently converting multimegabit-rate data into ATM cells and vice versa for use with the unified ATM interface.

(2) Description of the Related Art

Figure 1:
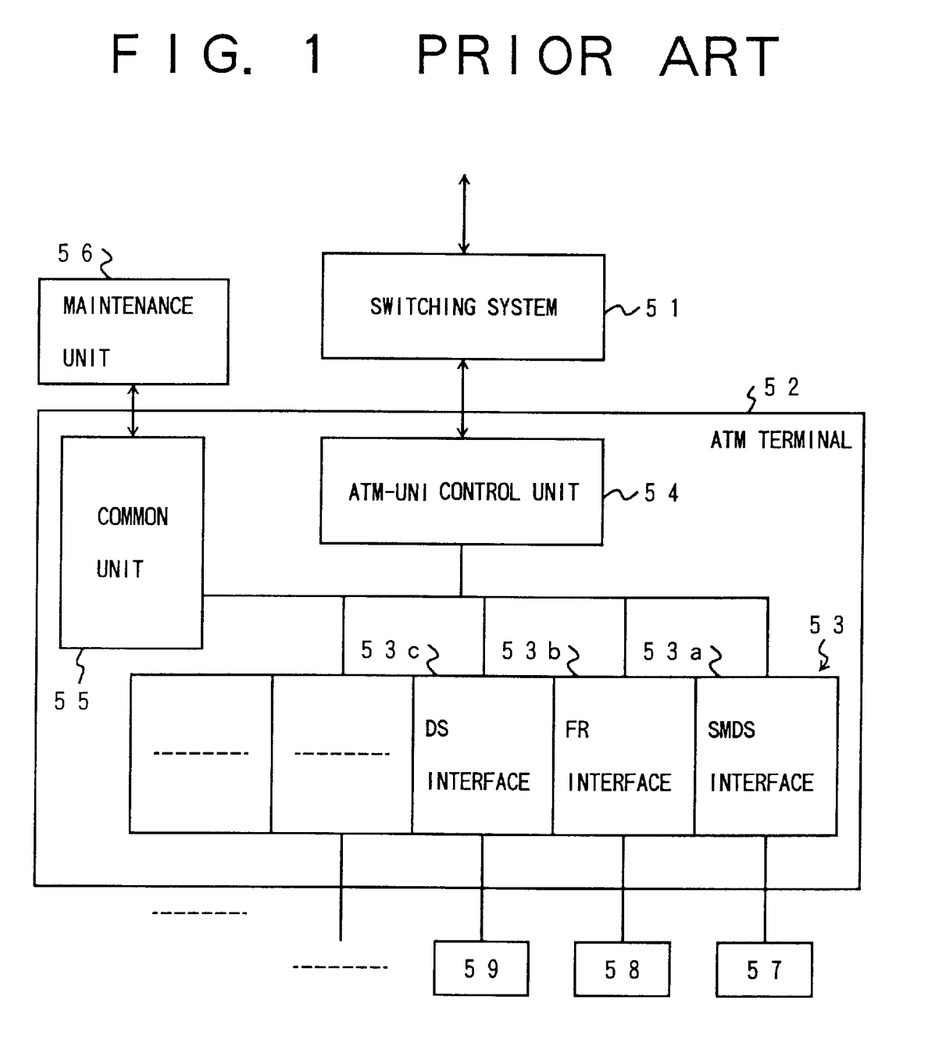
FIG. 1 is a block diagram of an asynchronous transfer mode (ATM) terminal.

FIG. 1 shows an asynchronous transfer mode (ATM) terminal which includes the above-mentioned data communications interfaces.

Referring to FIG. 1, an ATM terminal 52 is linked to a switching system 51 for the B-ISDN. The ATM terminal 52 includes an ATM-UNI (asynchronous transfer mode—user network interface) control unit 54, a service interface unit 53, and a common unit 55. A maintenance unit 56 is externally connected with the ATM terminal 52 via the common unit 55. The common unit 55 is connected to the service interface unit 53.

In the ATM terminal 52, shown in FIG. 1, the service interface unit 53 includes a SMDS (switched multimegabit data service) interface 53a, a FR (frame relay) interface 53b, a DS (digital signal—levels 1–3) interface 53c, etc. The common unit 55 includes a processing unit. Each of the above interfaces of the service interface unit 53 is controlled by the common unit 55. A SMDS terminal 57 is connected to the ATM terminal 52 via the SMDS interface 53a. A FR terminal 58 is connected to the ATM terminal 52 via the FR interface 53c. A DS terminal 59 is connected to the ATM terminal 52 via the DS interface 53c. Also, the other user terminals may be connected to the ATM terminal 52.

From the aspect of the switching system 54, the ATM terminal 52 is taken as one of a plurality of terminals on the B-ISDN network. The ATM terminal 52 is connected with the switching system 51 via the ATM-UNI control unit 54. The above-mentioned terminals, including the SMDS terminal 57, the FR terminal 58 and the DS terminal 59, are connected to the ATM terminal 52 via the service interface unit 53. Each of the interfaces of the ATM terminal 52 is controlled by the common unit 55. Therefore, the data communications service multiplexing is performed by the ATM terminal 52, and the unified ATM interfacing and switching is performed by the switching system 51.

Figure 2:
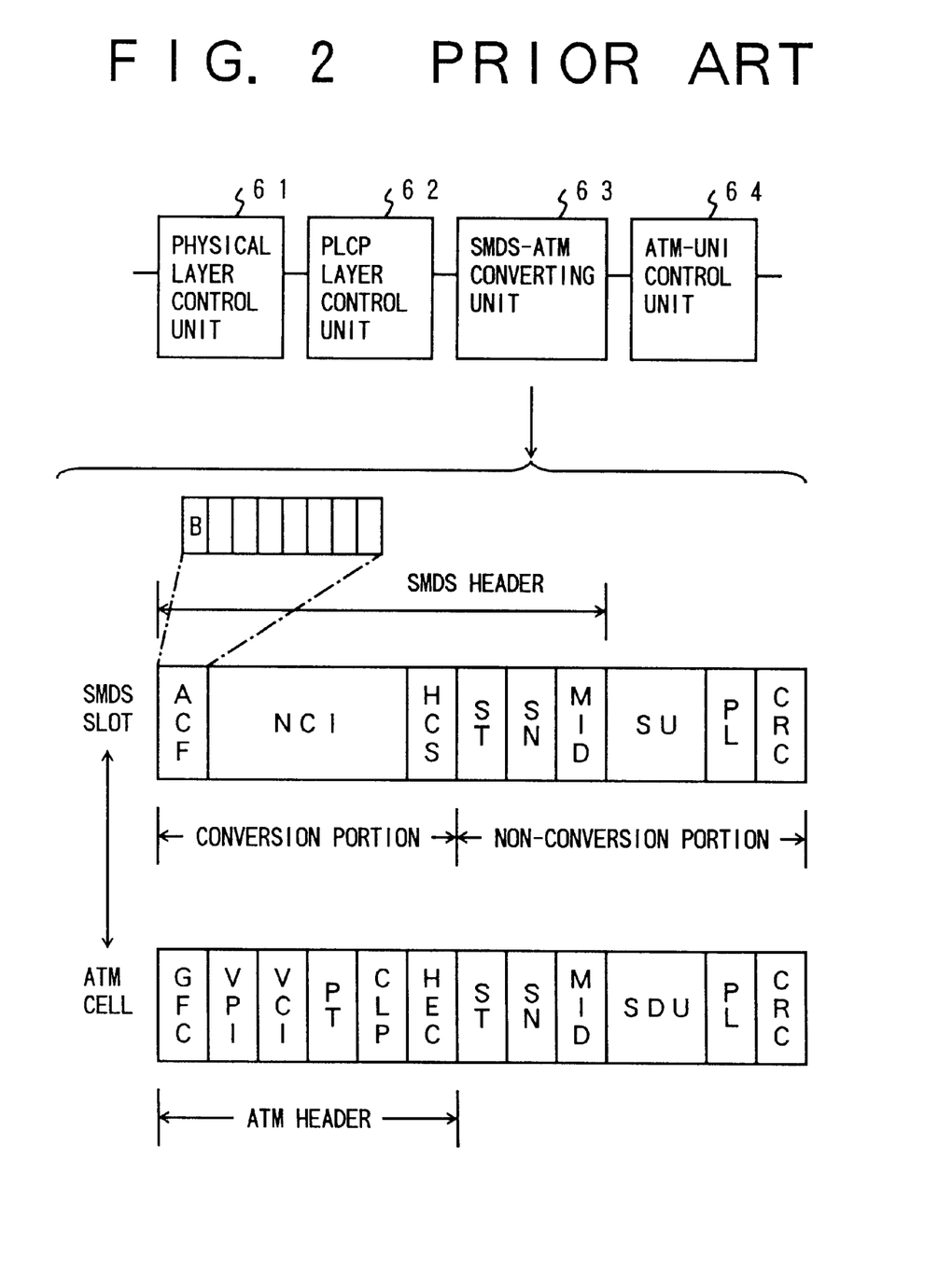
FIG. 2 is a diagram for explaining procedures for converting a switched multimegabit data services (SMDS) slot into an ATM cell and vice versa.

FIG. 2 shows a part of the ATM terminal 52 which performs procedures for converting SMDS slots into ATM cells and vice versa. Referring to FIG. 2, a physical layer control unit 61, a PLCP layer control unit 62, a SMDS-ATM converting unit 63, and an ATM-UNI control unit 64 are linked. This ATM-UNI control unit 64 corresponds to the ATM-UNI control unit 54 in FIG. 1. The physical layer control unit 61 corresponds to the SMDS terminal 57 connected to the ATM terminal 52 in FIG. 1.

Also, a relationship between a SMDS slot and an ATM cell is shown in FIG. 2. The SMDS slot contains a 7-byte SMDS header and a 46-byte SMDS data field. The SMDS header includes a 1-byte address control field (ACF), 3-byte network control information (NCI), a 1-byte header check sequence (HCS), and a 2-byte descriptor field. The descriptor field includes a set of segment type (ST) bits, a set of sequence number (SN) bits, and a set of message identifier descriptor (MID) bits.

The ACF of the SMDS slot includes a busy bit (B) at the most significant digit. This busy bit is indicative of whether the SMDS slot is used for data communication. The SMDS data field of the SMDS slot includes a 44-byte payload segmentation unit (SU) and a 2-byte remaining unit. The remaining unit includes a set of payload length (PL) bits and a set of payload cyclic redundancy check (CRC) bits.

The ATM cell, as shown in FIG. 2, contains a 5-byte ATM header and a 48-byte ATM data field. The ATM header includes a 4-bit general flow control (GFC), an 8-bit virtual path identifier (VPI), a 16-bit virtual channel identifier (VCI), a 3-bit payload type (PT), a 1-bit cell loss priority (CLP), and an 8-bit header error control (HEC).

In the case of the ATM adaptation layer (AAL) type 3/4, the ATM data field of the ATM cell includes a 2-byte descriptor field, a 44-byte segmentation and reassembly sublayer payload service data unit (SDU), and a 2-byte remaining unit. The descriptor field includes segment type (ST) bits, sequence number (SN) bits, and message identifier descriptor (MID) bits. The remaining unit includes payload length (PL) bits and payload cyclic redundancy check (CRC) bits.

As described above, the SMDS-ATM converting unit 63 converts the SMDS slots from the SMDS terminal 61 into the ATM cells, and the ATM cells from the SMDS-ATM converting unit 63 are transferred to the ATM-UNI control unit 64. More specifically, in this SMDS-ATM converting procedure, the ACF, the NCI and the HCS (which are a total of 5 bytes) of the SMDS header are converted into the GFC, the VPI, the VCI, the PT, the CLP and the HEC (which are a total of 5 bytes) of the ATM header. The remaining elements (the ST, the SN, the MID, etc.) of the SMDS slot are not converted but are inserted as the corresponding elements (the ST, the SN, the MID, etc.) of the ATM cell. Thus, the SMDS-ATM converting unit 63 produces the ATM cell from the SMDS slot as shown in FIG. 2.

On the other hand, when the SMDS slot is transmitted from the ATM terminal 52 to the SMDS terminal 57, the SMDS-ATM converting unit 63 converts the ATM cell from the ATM-UNI control unit 64 into the SMDS slot. In the case of the AAL type 3/4, the 5-byte conversion portion (the GFC, the VPI, the VCI, the PT, the CLP and the HEC) of the ATM cell are converted into the ACF, the NCI and the HCS of the SMDS header. The ST, the SN and the MID of the ATM cell are not converted but are inserted as the corresponding elements (the ST, the SN and the MID) of the SMDS slot. The SDU, the PL and the CRC of the ATM cell are not converted but are inserted as the corresponding elements (the SU, the PL and the CRC) of the SMDS slot.

The elements of the SMDS header and the elements of the ATM header are different from each other, but the total length of the SMDS slot and the total length of the ATM cell are the same. The conversion from the ATM header into the SMDS header is performed based on predetermined menu values, and the result of the error calculation of the header error control (HEC) of the ATM header is inserted as the header check sequence (HCS) of the SMDS header.

Figure 3:
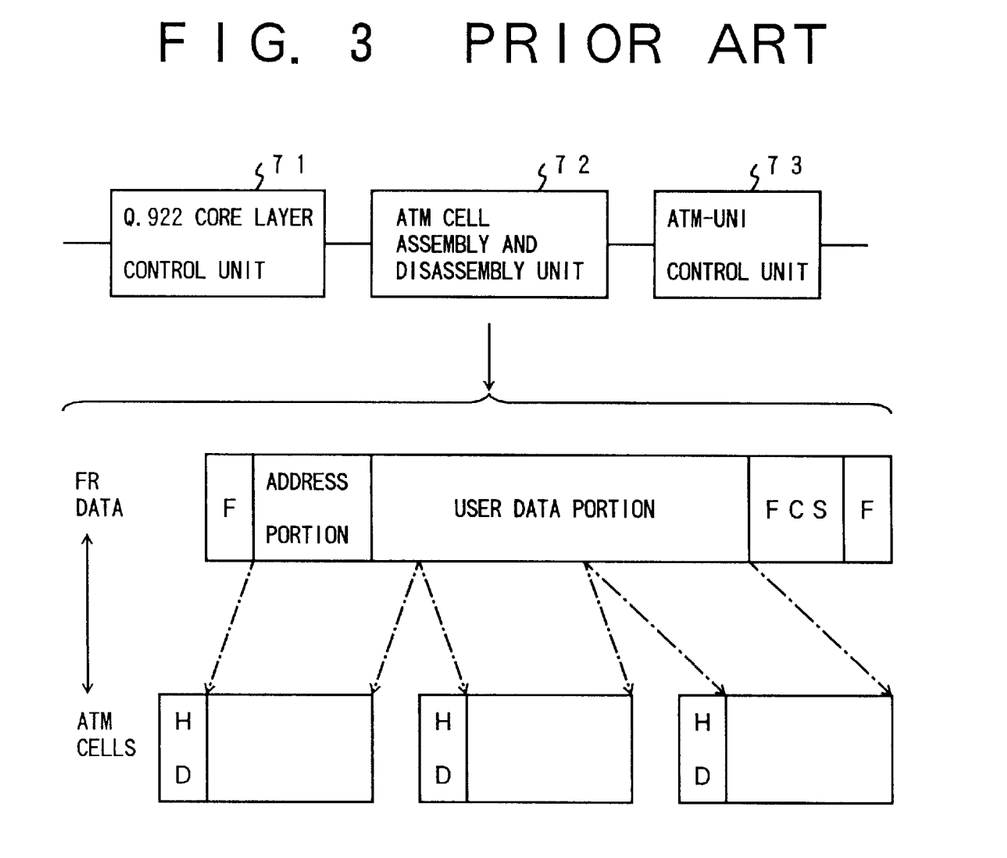
FIG. 3 is a diagram for explaining procedures for converting frame relay (FR) data into ATM cells and vice versa.

FIG. 3 shows a part of the ATM terminal which performs procedures for converting the FR data into the ATM cells and vice versa. Referring to FIG. 3, a Q.922 core layer control unit 71, an ATM cell assembly and disassembly unit 72, and an ATM-UNI control unit 73 are linked. This ATM-UNI control unit 73 corresponds to the ATM-UNI control unit 54 in FIG. 1. Q.922 is the number of the CCITT recommendation, and the Q.922 core layer control unit 71 carries out the processing between the unit 71 and the FR terminal based on the essential parts of the data-link layer protocol.

Also, a relationship between the FR data and the ATM cells is shown in FIG. 3. The format of the frame relay data is similar to the format of the High-level Data Link Control Procedure (HDLC). As shown in FIG. 3, the FR data includes a flag (F), an address portion, a user data portion, a frame check sequence (FCS), and a flag (F), and a frame is constituted by these elements of the FR data. The address portion includes a data link connection identifier (DLCI).

Figure 4A:
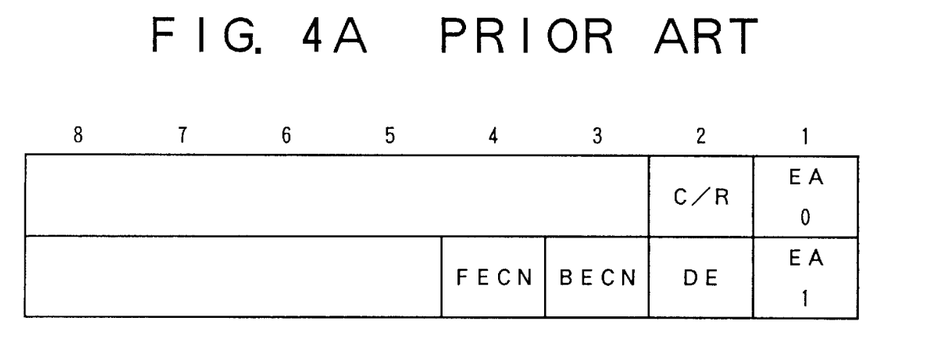
FIGS. 4A, 4B and 4C are diagrams for explaining an address portion of the FR data.
Figure 4B:
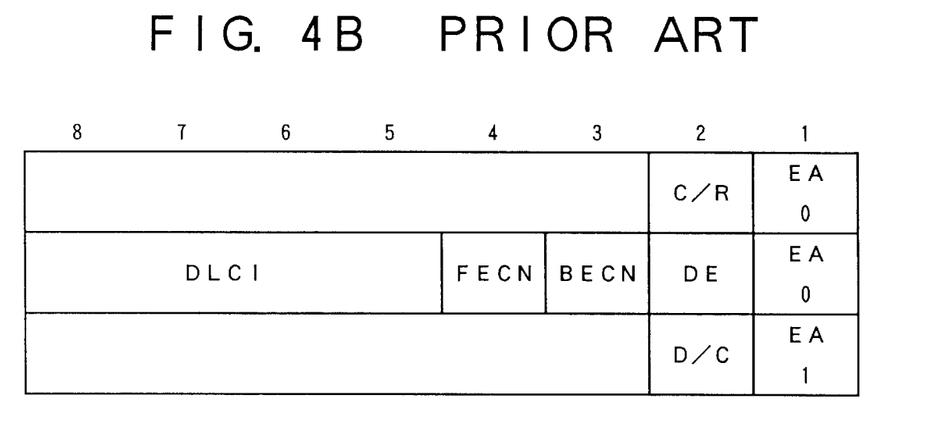
Figure 4C:
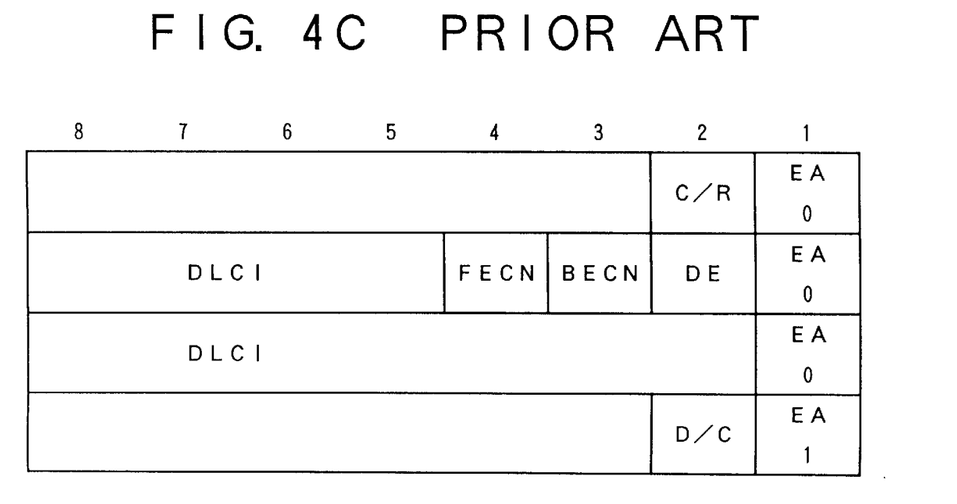

FIGS. 4A, 4B and 4C are diagrams for explaining the address portion of the frame relay data. FIG. 4A shows a two-octet address portion, FIG. 4B shows a three-octet address portion, and FIG. 4C shows a four-octet address portion. As shown, the address portion of the FR data includes the data link connection identifier (DLCI), an EA (extended address field) bit, a C/R (command/response) bit, a FECN (forward direction congestion notice) bit, a BECN (backward direction congestion notice) bit, a DE (disregard indicator) bit, and a D/C (DLCI/DL core control indicator) bit.

The DLCI identifier is 10 bits of information for data link connection identification. As the content of this DCLI identifier, 0 is used to indicate an in-channel signal, 1–15 are reserved, 16–511 are used to support user data by a channel other than the D-channel, 512–991 are used to identify a logical link for supporting user data, 992–1007 are used to indicate a data-link layer management of the frame mode bearer service, 1008–1022 are reserved, and 1023 is used to indicate an in-channel data-link layer management.

As shown in FIG. 3, when converting the FR data into the ATM cells, the elements (the address portion and the user data portion) of each frame of the FR data, other than the flags (F) and the FCS, are converted into body portions of the ATM cells. An ATM header (HD) is added to each of the ATM cells. On the other hand, when converting the ATM cells into the FR data, the body portions of the ATM cells (the headers (HD) are deleted) are assembled into the FR data, the result of calculation of the frame check sequence (FCS) is inserted to the FCS of the FR data, and the flags (F) are added to the FR data.

Figure 5:
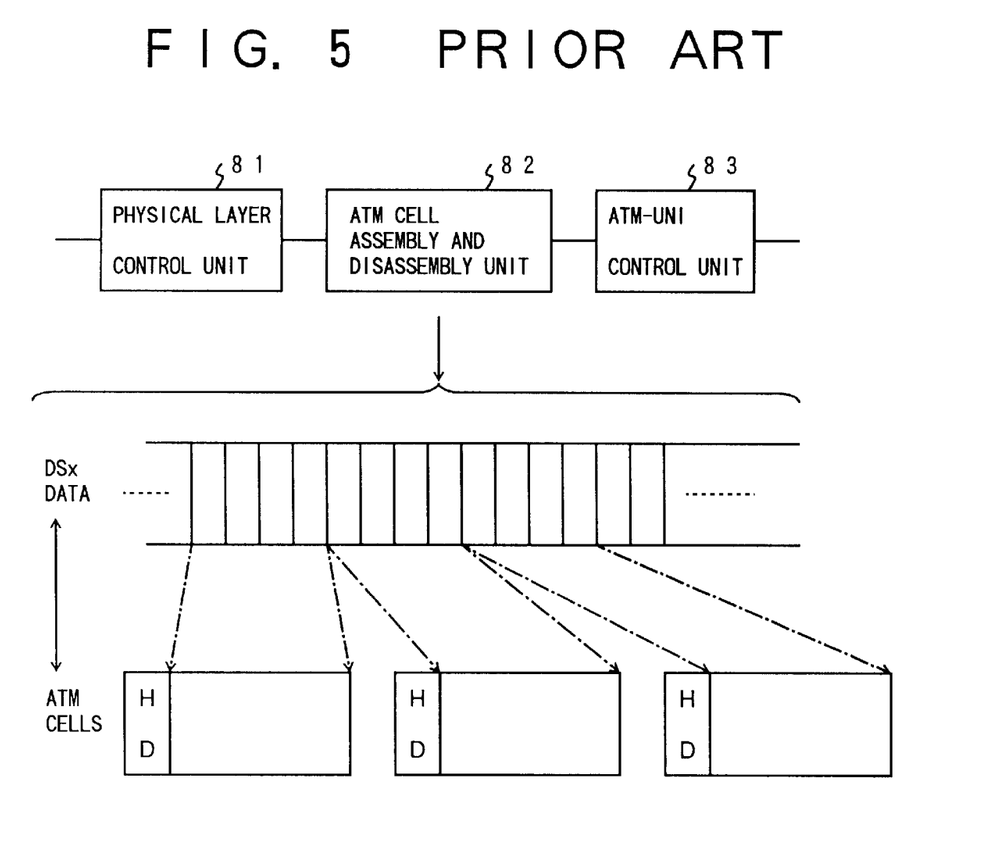
FIG. 5 is a diagram for explaining procedures for converting digital signal (DS) data into ATM cells and vice versa.

FIG. 5 shows a part of the ATM terminal which performs procedures for converting the DS data into the ATM cells and vice versa. Referring to FIG. 5, a physical layer control unit 81, an ATM cell assembly and disassembly unit 82, and an ATM-UNI control unit 83 are linked. This ATM-UNI control unit 83 corresponds to the ATM-UNI control unit 52 in FIG. 1. User terminals are connected to the physical layer control unit 81, and the digital signals DS1 (1.544 Mbps), DS2 (6.312 Mbps) and DS3 (44.736 Mbps) are transmitted and received between the user terminals and the physical layer control unit 81.

Also, a relationship between the DS data and the ATM cells is shown in FIG. 5. The ATM cell assembly and disassembly unit 82 converts the DS data into the ATM cells and converts the ATM cells into the DS data.

When converting the DS data from the DS terminal 58 into the ATM cells for the switching system 51, the DS data is divided into a plurality of 47-byte segments. An ATM header (HD) is added to the top of each of the segments of the DS data, and 1-byte payload cyclic redundancy check (CRC) bits are added to the bottom of each segment of the DS data. The ATM header, one segment of the DS data, and the CRC bits form an ATM cell including 53 bytes of information. The ATM cells are thus produced by disassembling the DS data and adding the ATM header and the CRC bits. These ATM cells are transmitted to the switching system 51 via the ATM-UNI control unit 83.

When converting the ATM cells from the switching system 51 into the DS data for the DS terminal 59, the ATM header (HD) and the payload cyclic redundancy check (CRC) bit are removed from each of the ATM cells. The DS data is produced by assembling the remaining elements of the ATM cells.

The above SMDS, FR and DS data communications services are among the multimegabit-rate data communications services which are currently used. However, it is difficult to unify the SMDS, FR and DS services into the narrowband-ISDN (N-ISDN) services since the N-ISDN uses low transmission rates only. Therefore, it is proposed to unify these services into the B-ISDN services using the above ATM interface which provides a high transmission rate above 600 Mbps for the multimegabit-rate data communications services.

However, the above-described ATM conversion procedures take into account converting all the multimegabit-rate data into the ATM cells, regardless of whether the data is effective or ineffective. Even when the data is ineffective, the above ATM conversion procedures perform converting the data into the ATM cells, and such ATM cells are transmitted. Therefore, the efficiency of the ATM conversion of the above procedures is not adequate for the multiplexing of the SMDS, FR and DS data communications services.

It is difficult to efficiently convert multimegabit-rate data into ATM cells and vice versa with the above-mentioned ATM terminal including the multiple service interfaces.

SUMMARY OF THE INVENTION

Accordingly, it is a general object of the present invention to provide a method and apparatus for converting multimegabit-rate data into ATM cells and vice versa in which the above-described problems are eliminated.

Another object of the present invention is to provide an ATM conversion method which efficiently converts multimegabit-rate data into ATM cells and vice versa in order to increase an efficiency of transmission on a broadband integrated services digital network.

Still another object of the present invention is to provide an ATM conversion apparatus which efficiently converts multimegabit-rate data into ATM cells and vice versa in order to increase an efficiency of transmission on a broadband integrated services digital network.

The above-mentioned objects of the present invention are achieved by a method for converting multimegabit-rate data into asynchronous transfer mode ATM cells and vice versa, which includes the steps of: determining whether the data is effective or ineffective in accordance with a portion of the data; converting the data into the ATM cells when the data is detected as being effective; and disregarding the data when the data is detected as being ineffective.

The above-mentioned objects of the present invention are achieved by an apparatus for converting multimegabit-rate data into asynchronous transfer mode (ATM) cells and vice versa, which includes: a service interface unit including at least one of a switched multimegabit data services (SMDS) interface unit, a frame relay (FR) interface unit, and a digital signal (DS) interface unit; and an ATM interface unit connected with a switching system, the above at least one of the interface units included in the service interface unit including: a determining unit which determines whether the data is effective or ineffective in accordance with a portion of the data; and an ATM converting unit, connected to the determining unit, which converts the data into the ATM cells when the data is detected as being effective, and transfers the ATM cells to the ATM interface unit, the ATM converting unit disregarding the data when the data is detected as being ineffective.

The ATM conversion method and apparatus of the present invention utilize a busy bit of an address control field of a switched multimegabit services (SMDS) slot, a data link connection identifier (DLCI) of frame relay (FR) data and a loss-of-signal (LOS) signal or alarm-indication (AI) signal of digital signal (DS) data to detect whether the multimegabit-rate data, including the SMDS slot, the FR data and the DS data, is effective or ineffective. The ATM conversion method and apparatus convert only the effective data into the ATM cells and disregard the ineffective data, and the efficiency of the ATM conversion is increased. Accordingly, the efficiency of the transmission on the ATM network can be increased by the ATM conversion method and apparatus of the present invention.

BRIEF DESCRIPTION OF THE DRAWINGS

The above and other objects, features and advantages of the present invention will become more apparent from the following detailed description when read in conjunction with the accompanying drawings in which.

DESCRIPTION OF THE PREFERRED EMBODIMENT

A description will now be given of the preferred embodiment of the present invention with reference to the accompanying drawings.

Figure 6:
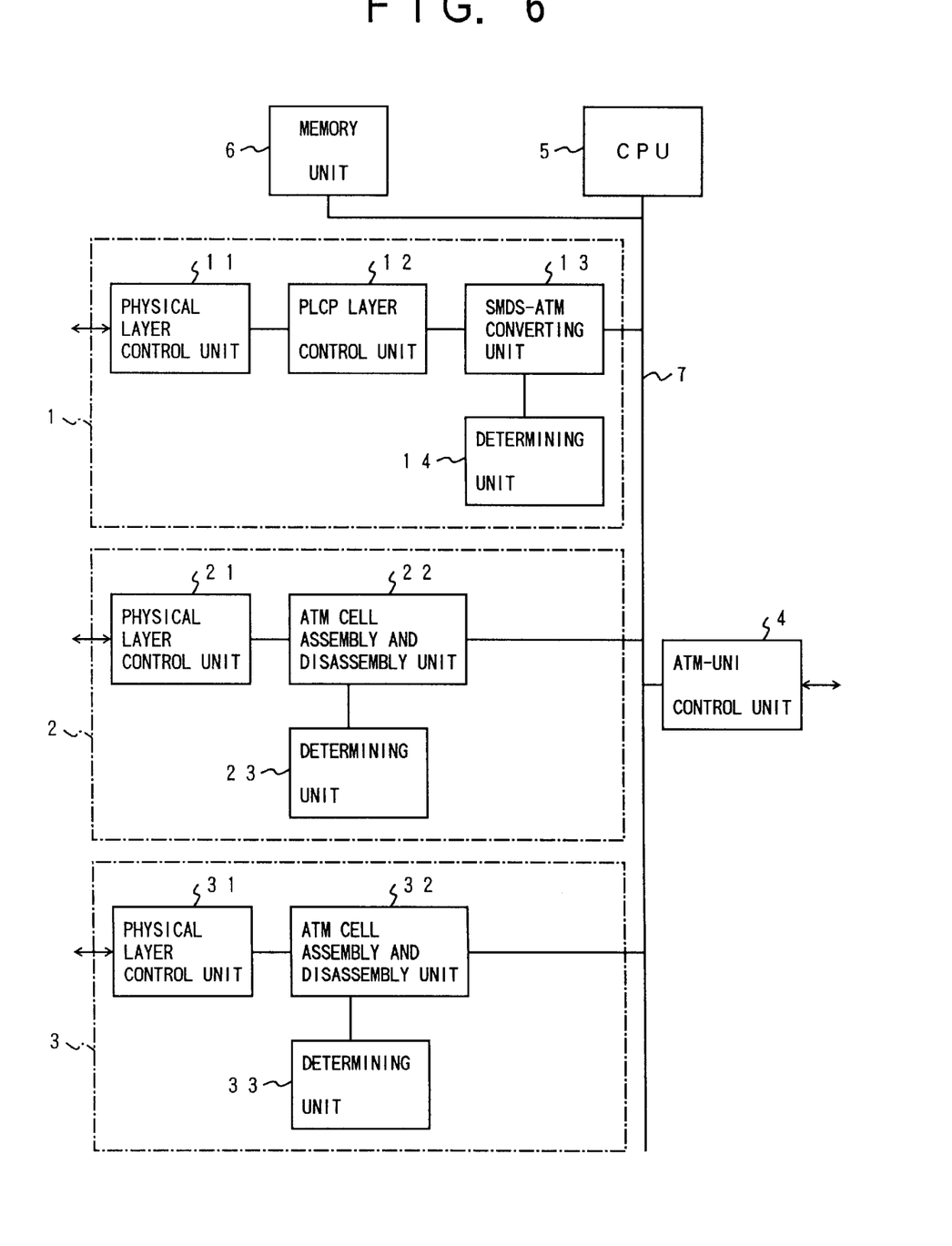
FIG. 6 is a block diagram of an ATM terminal to which an embodiment of the present invention is applied.

FIG. 6 shows an ATM (asynchronous transfer mode) terminal to which one embodiment of the present invention is applied.

Referring to FIG. 6, this ATM terminal includes a SMDS (switched multimegabit data services) interface unit 1, a FR (frame relay) interface unit 2, and a DS (digital signal) interface unit 3. The ATM terminal includes an ATM-UNI (asynchronous transfer mode—user network interface) control unit 4, a CPU (central processing unit) 5, and a memory unit 6. These components of the ATM terminal are interconnected by an internal bus 7.

In the present embodiment, the SMDS interface unit, the FR interface unit and the DS interface unit are included in the ATM terminal. The present invention is not limited to this embodiment. The ATM terminal of the present invention can include at least one of the three interface units, and it can include two or more interface units of the same kind for each of these interface units in accordance with the adaptation of user terminals to the ATM terminal.

The CPU 5 controls the three interface units 1, 2 and 3, the ATM-UNI control unit 4, the memory unit 6 and the internal bus 7 to carry out the ATM conversion procedures which will be described later.

The previously-described ATM terminals in FIGS. 2, 3 and 5 include the ATM-UNI control units 64, 73 and 83, respectively. The ATM terminal in the present embodiment, as shown in FIG. 6, includes the ATM-UNI control unit 4 which is shared by the interface units 1, 2 and 3.

The SMDS interface unit 1 includes a physical layer control unit 11, a PLCP layer control unit 12, a SMDS-ATM converting unit 13, and a determining unit 14. The determining unit 14 reads the busy bit (B) of the address control field (ACF) of a SMDS slot which is input, and detects whether the SMDS slot is used for data communication, in accordance with the content of the busy bit (B) of the SMDS slot.

When the determining unit 14 detects that the SMDS slot is not used, it is determined that the SMDS slot is ineffective. The SMDS-ATM converting unit 13 disregards the SMDS slot.

When the determining unit 14 detects that the SMDS slot is used, it is determined that the SMDS slot is effective. The SMDS-ATM converting unit 12 converts the SMDS slot into an ATM cell as shown in FIG. 2. This ATM cell is transmitted from the SMDS-ATM converting unit 13 to a switching system (not shown) via the ATM-UNI control unit 4.

The FR interface unit 2 includes a physical layer control unit 21, an ATM cell assembly and disassembly unit 22, and a determining unit 23. The physical layer control unit 21 in this embodiment corresponds to the Q.922 core layer control unit 71 in FIG. 3. The determining unit 23 reads the data link connection identifier (DLCI) of the address portion of the frame relay (FR) data, and detects whether the DLCI is a predetermined data link.

When the determining unit 23 detects that the DLCI of the FR data is the predetermined data link, it is determined that the FR data is effective. The ATM cell assembly and disassembly unit 22 assembles the ATM cells from the FR data with respect to each frame.

When the determining unit 23 detects that the DLCI does not indicate the predetermined data link, it is determined that the FR data is ineffective. The ATM cell assembly and disassembly unit 22 disregards the FR data.

The DS interface unit 3 includes a physical layer control unit 31, an ATM cell assembly and disassembly unit 32, and a determining unit 33. The determining unit 32 reads the digital signal (DS) data, sent from the physical layer control unit 31 to the ATM cell assembly and disassembly unit 32, and detects whether a loss-of-signal (LOS) signal or alarm indication (AI) signal is included in the DS data.

When the determining unit 33 detects that the LOS signal or AI signal is included in the DS data, it is determined that the DS data is ineffective. The ATM cell assembly and disassembly unit 32 disregards the DS data.

When the determining unit 33 detects that no LOS signal or AI signal is included in the DS data, it is determined that the DS data is effective. The ATM cell assembly and disassembly unit 32 converts the DS data into the ATM cells as shown in FIG. 5.

Figure 7:
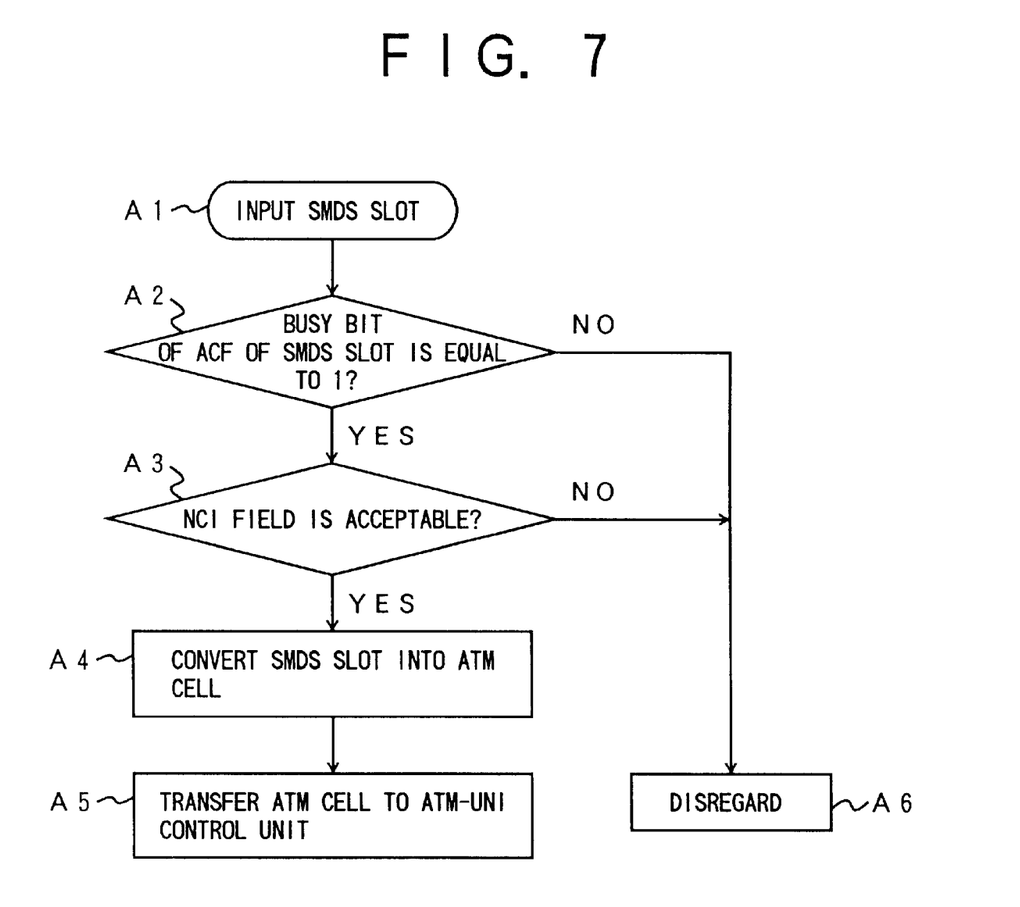
FIG. 7 is a flowchart for explaining a SMDS-ATM converting procedure performed in the embodiment of the present invention.

FIG. 7 is a flowchart for explaining a SMDS-ATM converting procedure performed in the embodiment of the present invention.

Referring to FIG. 7, the SMDS interface unit 1, at step A1, inputs a SMDS slot. The determining unit 14, at step A2, reads a busy bit (B) of the address control field (ACF) of the input SMDS slot, and detects whether the SMDS slot is used for data communication, in accordance with the content of the busy bit (B) of the SMDS slot.

More specifically, the determining unit 14 detects whether the busy bit (B) of the SMDS slot is equal to 1. When the busy bit (B) is equal to 1, it indicates that the SMDS slot is used. Otherwise, it indicates that the SMDS slot is not used.

When the result at the step A2 is affirmative, it is determined that the SMDS slot is used. The determining unit 14, at step A3, reads a network control information (NCI) field of the SMDS slot, and detects whether the NCI of the SMDS slot is acceptable in accordance with the content of the NCI.

When the result at the step A3 is affirmative, it is determined that the NCI field of the SMDS slot is accepted and the SMDS slot is effective. The SMDS-ATM converting unit 13, at step A4, converts the SMDS slot into the ATM cell.

The SMDS interface unit 1, at step A5, transfers the ATM cell from the SMDS-ATM converting unit 13 to the ATM-UNI control unit 4.

When the result at the step A2 is negative (the B is not equal to 1) or when the result at the step A3 is negative (the NCI is rejected), it is determined that the SMDS slot is ineffective. The SMDS-ATM converting unit 13, at step A6, disregards the SMDS slot.

Accordingly, in the present embodiment, only the SMDS slots which are effective are converted into the ATM cells, and the efficiency of the SMDS-ATM conversion is increased. Therefore, the efficiency of the transmission on the ATM network can be increased.

Figure 8:
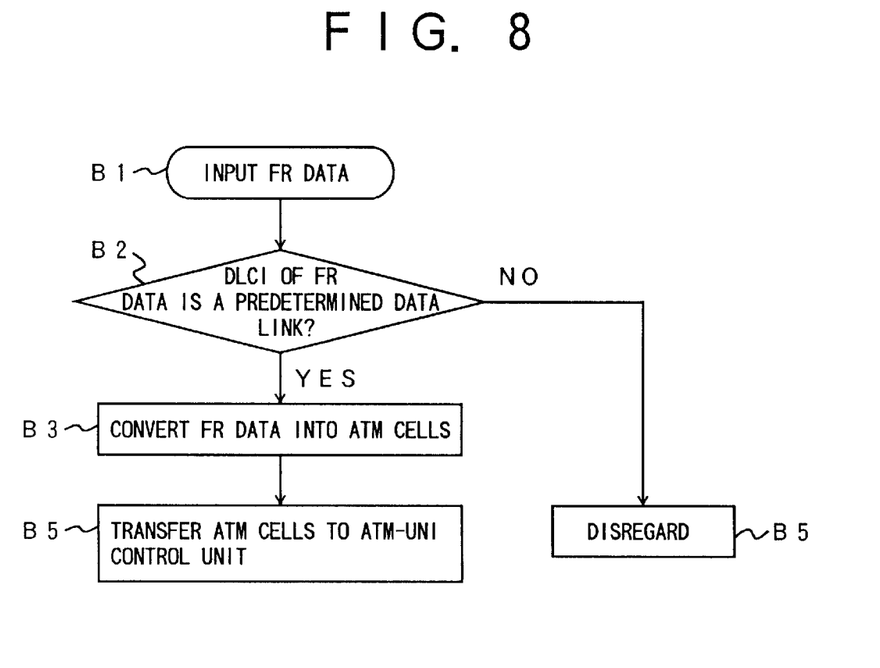
FIG. 8 is a flowchart for explaining a FR-ATM converting procedure performed in the embodiment of the present invention.

FIG. 8 is a flowchart for explaining a FR-ATM converting procedure performed in the embodiment of the present invention.

Referring to FIG. 8, the FR interface unit 2, at step B1, inputs FR (frame relay) data. The determining unit 23, at step B2, reads a data link connection identifier (DLCI) of the address portion of the FR data, and detects whether the DLCI of the FR data is a predetermined data link.

More specifically, the predetermined data link is stored, and the determining unit 23 detects whether the DLCI of the FR data matches with the stored predetermined data link.

When the result at the step B2 is affirmative, it is determined that the FR data is effective. The ATM cell assembly and disassembly unit 22, at step B3, converts the FR data into ATM cells.

The FR interface unit 2, at step B4, transfers the ATM cells from the ATM cell assembly and disassembly unit 22 to the ATM-UNI control unit 4.

When the result at the step B2 is negative, it is determined that the FR data is ineffective. The ATM cell assembly and disassembly unit 22, at step B5, disregards the FR data.

Accordingly, in the present embodiment, only the FR data which is effective is converted into the ATM cells, and the efficiency of the FR-ATM conversion is increased. Therefore, the efficiency of the transmission on the ATM network can be increased.

Figure 9:
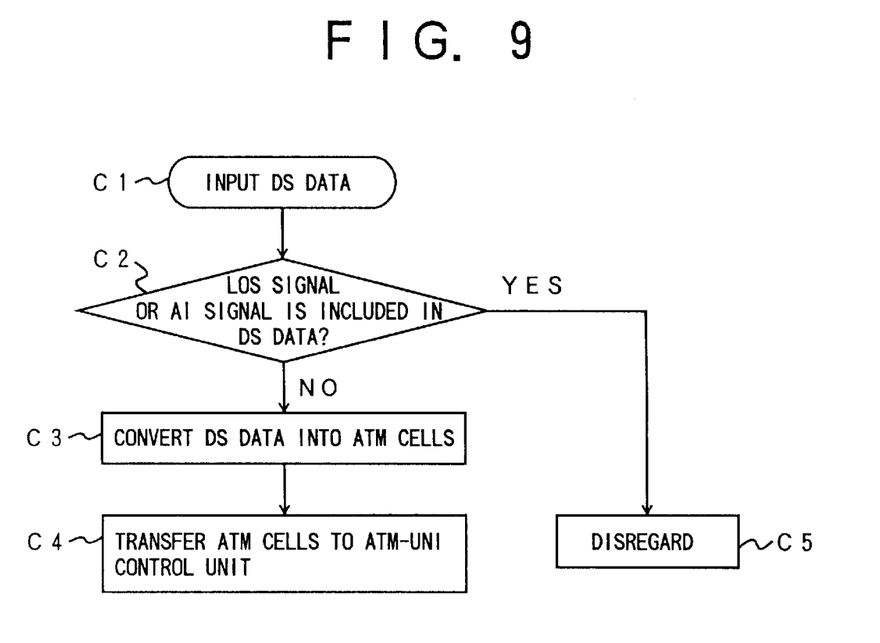
FIG. 9 is a flowchart for explaining a DS-ATM converting procedure performed in the embodiment of the present invention.

FIG. 9 is a flowchart for explaining a DS-ATM converting procedure performed in the embodiment of the present invention.

Referring to FIG. 9, the DS interface unit 3, at step C1, inputs DS (digital signal) data. The determining unit 33, at step C2, reads the DS data, and detects whether the LOS (loss-of-signal) signal or AI (alarm indication) signal is included in the DS data.

When the result at the step C2 is negative (or no LOS signal or AI signal included in the DS data), it is determined that the DS data is effective. The ATM cell assembly and disassembly unit 32, at step C3, converts the DS data into ATM cells as shown in FIG. 5.

The DS interface unit 3, at step C4, transfers the ATM cells from the ATM cell assembly and disassembly unit 32 to the ATM-UNI control unit 4.

When the result at the step C2 is affirmative, it is determined that the DS data is ineffective. The ATM cell assembly and disassembly unit 32, at step C5, disregards the DS data.

Accordingly, in the present embodiment, only the DS data which is effective is converted into the ATM cells, and the efficiency of the DS-ATM conversion is increased. Therefore, the efficiency of the transmission on the ATM network can be increased.

Further, the present invention is not limited to the above-described embodiment, and variations and modifications may be made without departing from the scope of the present invention. For example, a new version of a control program which is executed by the CPU 5 to control the SMDS interface unit 1, the FR interface unit 2 and the DS interface unit 3 in the ATM terminal in FIG. 6 may be downloaded from a maintenance unit to the memory unit 6 of the ATM terminal. Therefore, the ATM conversion procedures performed by the ATM terminal can be modified with respect to each of these interface units to be in accordance with the adaptation of user terminals to the ATM terminal.

What is claimed is:

1. A method of converting data, received by a service interface unit, into asynchronous transfer mode ATM cells and vice versa, comprising the steps of: determining whether switched-multimegabit-data-service data, received by a switched-multimegabit-data-service (SMDS) interface unit, is effective or ineffective in accordance with a portion of the data;

converting the data into the ATM cells in response to the data being determined as being effective; and disregarding the data in response to the data being determined as being ineffective;

wherein said determining step includes:

reading a busy bit of an address control field of the data received by the SMDS interface unit; and determining whether the data is effective or ineffective in accordance with the busy bit.

2. The method according to claim 1, wherein said converting step includes:

converting a portion of a header of the data into an ATM header; and producing an ATM cell from the data by inserting the remaining portion of the data into a data field of the ATM cell and inserting the ATM header into the ATM cell.

3. A method of converting data, received by a service interface unit, into asynchronous transfer mode ATM cells and vice versa, comprising the steps of:

determining whether frame relay data, received by a frame relay (FR) interface unit, is effective or ineffective in accordance with a portion of the data;

converting the data into the ATM cells in response to the data being determined as being effective; and disregarding the data in response to the data being determined as being ineffective;

wherein said determining step includes:

detecting whether a data link connection identifier of an address portion of the data received by the FR interface unit indicates a predetermined data link;

determining the data as being effective when the data link connection identifier indicates the predetermined data link; and determining the data as being ineffective when the data link connection identifier does not indicate the predetermined data link.

4. The method according to claim 3, wherein said converting step includes:

dividing the data into a plurality segments; and producing the ATM cells from the data by adding an ATM header to each of the plurality of segments.

5. A method of converting data, received by a service interface unit, into asynchronous transfer mode ATM cells and vice versa, comprising the steps of:

determining whether digital signal data, received by a digital signal (DS) interface unit, is effective or ineffective in accordance with a portion of the data;

converting the data into the ATM cells in response to the data being determined as being effective; and disregarding the data in response to the data being determined as being ineffective;

wherein said determining step includes:

detecting whether a loss-of-signal signal or an alarm-indication signal is included in the data received by the DS interface unit;

determining the data as being ineffective when the loss-of-signal signal or the alarm-indication signal is included in the data; and determining the data as being effective when no loss-of-signal signal or alarm-indication signal is included in the data.

6. The method according to claim 5, wherein said converting step includes:

dividing the data into a plurality of segments each with a predetermined number of bits; and producing the ATM cells from the data by adding an ATM header and cyclic redundancy check bits to each of the plurality of segments.

7. An apparatus for converting data, received by a service interface unit, into asynchronous transfer mode ATM cells and vice versa, which transmits the ATM cells to and receives the ATM cells from a switching system, comprising:

a service interface unit including at least one of a switched-multimegabit-data-services (SMDS) interface unit, a frame-relay (FR) interface unit, and a digital-signal (DS) interface unit; and an ATM interface unit connected with the switching system, said at least one of said three interface units included in said service interface unit comprising:

a determining unit which determines whether the data received by the service interface unit is effective or ineffective in accordance with a portion of the data; and an ATM converting unit, connected to said determining unit, which converts the data into the ATM cells in response to the data being determined as being effective by said determining unit, and transfers the ATM cells to said ATM interface unit, said ATM cell converting unit disregarding the data in response to the data being determined by said determining unit as being ineffective;

wherein said determining unit reads the portion of the data to make the determination, said portion of the data being one of a busy bit of an address control field of a switched-multimegibit-data-services slot received by the SMD interface unit, a data link connection identifier of an address portion of frame relay data received by the FR interface unit, and a loss-of-signal signal or an alarm-indication signal included in digital signal data received by the DS interface unit.

8. The apparatus according to claim 7, wherein said ATM converting unit converts the ATM cells from said ATM interface unit into at least one of switched-multimegabit-data-services slots for the SMDS interface unit, frame relay data for the FR interface unit, and digital signal data for the DS interface unit.

* * * * *